United States Patent
Bernadat et al.

(10) Patent No.: US 7,343,741 B2
(45) Date of Patent: Mar. 18, 2008

(54) VEHICLE MASTER CYLINDER

(75) Inventors: Olivier Bernadat, Le Perreux sur Marne (FR); Yannick Nen, Arpajon (FR); Bruno Beylerian, Louvres (FR); Philippe Bourlon, Dammartin en Goele (FR)

(73) Assignee: Robert Bosch, GmbH, Stuttgart (DE)

( * ) Notice: Subject to any disclaimer, the term of this patent is extended or adjusted under 35 U.S.C. 154(b) by 0 days.

(21) Appl. No.: 11/523,191

(22) Filed: Sep. 19, 2006

(65) Prior Publication Data
US 2007/0068154 A1    Mar. 29, 2007

(30) Foreign Application Priority Data
Sep. 26, 2005 (FR) .................................. 05 09909

(51) Int. Cl.
*B60T 11/236* (2006.01)
(52) U.S. Cl. ......................................... 60/588; 277/441

(58) Field of Classification Search .................. 60/588; 277/441, 555
See application file for complete search history.

(56) References Cited

U.S. PATENT DOCUMENTS 4,945,728 A * 8/1990 Coleman ...................... 60/588
5,163,692 A * 11/1992 Schofield et al. ........... 277/555

\* cited by examiner

*Primary Examiner*—F. Daniel Lopez
(74) *Attorney, Agent, or Firm*—Leo H. McCormick, Jr.; Sarah Taylor

(57) ABSTRACT

A master cylinder (1) having a bore (3) fitted with at least one piston (4, 5) and at least one seal (19, 20, 21, 22). The seal (19, 20, 21, 22) is partially stiffened by a reinforcement member (25). In order to retain the piston (4,5) in the bore (3) a groove (31) is located on a circumference of the piston (4,5) against which the sealing member (25) bears with the piston (4,5) in a rest position to retain the piston (4,5) in bore (3).

7 Claims, 1 Drawing Sheet

VEHICLE MASTER CYLINDER

The invention relates to a master cylinder of an automobile. The object of the invention is to improve the performance of a master cylinder. The invention is more particularly intended for the automobile field but could apply to other fields.

BACKGROUND OF THE INVENTION

Tandem master cylinders are known comprising a primary hydraulic circuit and a secondary hydraulic circuit, each of the circuits having a primary and secondary piston respectively. The primary piston and the secondary piston are made to slide in a bore formed in a body of the master cylinder. The primary piston and the secondary piston define a primary chamber and a secondary chamber respectively. The primary chamber and the secondary chamber are filled with hydraulic fluid or brake liquid via a primary hydraulic fluid reservoir and a secondary hydraulic fluid reservoir respectively.

The master cylinder comprises a first, second, third and fourth sealing means. The first means is situated in the primary chamber and forms a primary sealing cup. This primary sealing cup is positioned at an inlet of the primary chamber. This primary cup isolates the primary chamber from the outside of the master cylinder. The second sealing means is situated in the primary chamber and forms a primary seal. This primary seal is positioned between a wall delimited by the bore of the master cylinder and the primary piston. This primary seal controls the passage of hydraulic fluid from the primary reservoir to the primary chamber according to the position of the primary piston in the bore of the master cylinder.

The third sealing means is situated in the secondary chamber and forms a secondary sealing cup. This secondary sealing cup is positioned at an inlet of the secondary chamber and isolates the secondary chamber from the primary chamber. The fourth sealing means is situated in the secondary chamber and forms a secondary seal. This secondary seal is positioned between a wall delimited by the bore of the master cylinder and the secondary piston. This secondary seal controls the passage of hydraulic fluid from the secondary reservoir to the secondary chamber according to the The primary seal, the secondary seal, the primary cup and the secondary cup are each housed in a peripheral groove hollowed out in the wall of the master cylinder and surrounding the piston. These seals and cups are made of rubber and possess profiles with parts folded in the shape of a U. These seals and cups form rings with an axis of revolution coaxial to the axis of movement of the piston in the bore of the master cylinder.

At rest, that is so say when the brake pedal of the vehicle is not actuated, the primary chamber and secondary chamber are filled with brake liquid coming from the primary reservoir and the secondary reservoir respectively. During braking, that is to say when the brake pedal is actuated, the flow of brake liquid coming from the reservoirs into the primary chamber and into the secondary chamber is blocked. In point of fact, while advancing along the wall of the master cylinder, the primary piston and the secondary piston are positioned with respect to the primary seal and the secondary seal respectively so that the primary seal and the secondary seal block the passage of liquid from the primary reservoir and the secondary reservoir to the primary chamber and secondary chamber respectively. The pressure inside the primary chamber and the secondary chamber then increases. It follows that brake liquid is injected from the chambers into the braking devices of the vehicle.

During the movement of the primary piston along the wall of the master cylinder, for example, the primary piston is caused to rub against the primary seal. When sudden braking occurs, that is to say when the brake pedal is suddenly actuated, the primary seal may roll on itself inside the corresponding groove, or else extrude from the groove or even tear. Thus, there is the risk of arriving at a situation where the primary seal no longer acts as a seal for the primary chamber in relation to the primary reservoir. The fluid contained in the primary chamber may then creep between the wall and the primary piston. The result is braking which is made much less effective or may even become deficient. It will be understood that such braking may thus harm the safety of a driver of the vehicle.

In order to solve this problem, in the invention, the stiffness is increased of a wing of the seal concerned which bears against the piston. Accordingly, in the case of a sudden return of the latter or during transport, the risk of deterioration of the seal is reduced. In order to increase this the risk of deterioration of the seal is reduced. In order to increase this stiffness, it would be possible to increase the size of the primary or secondary seal so as to prevent the primary or secondary seal from rolling on itself or tearing.

SUMMARY OF THE INVENTION

Preferably, in order to arrive at this result, the invention provides for part stiffening of the seal by reinforcement. This stiffened part is intended to be placed bearing against the piston. With such a reinforcement, the rigidity is appreciably increased in a direction parallel to the direction of movement of the piston, (which prevents rolling) without increasing too much the radial rigidity (which is calculated so as to facilitate flows at rest or on withdrawal).

Accordingly, the seal no longer risks rolling on itself nor of extruding or even of tearing.

The reinforcement is made in flexible ring form.

The object of the invention is therefore a master cylinder of an automobile comprising:
- a body hollowed out from a bore,
- at least one piston sliding along a wall formed by the bore of the body and defining a chamber,
- at least one hydraulic fluid reservoir emerging in the bore, and
- at least one seal for the chamber with a U-shaped section housed between the wall and the piston, characterized in that:
- the seal includes a stiffening reinforcement.

The invention will be better understood on reading the following description and examining the accompanying figures. These are only given as an indication and in no way limit the invention.

BRIEF DESCRIPTION OF THE INVENTION

DETAILED DESCRIPTION OF THE INVENTION

Figure 1:
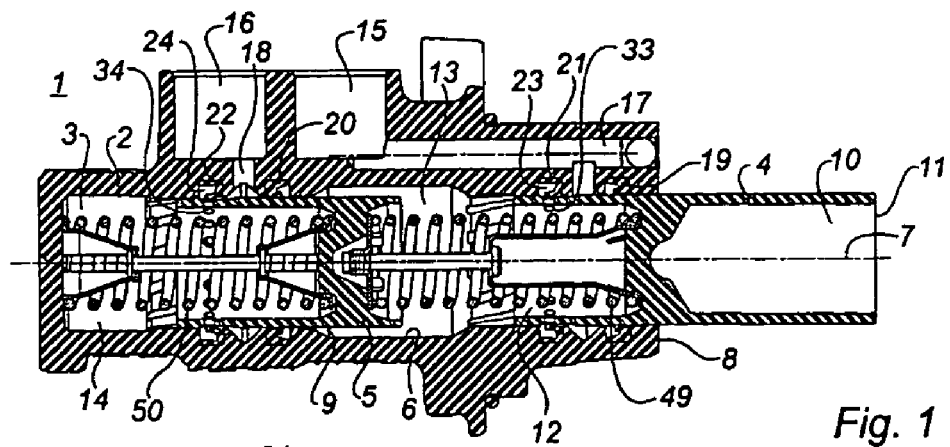
FIG. 1 is a longitudinal section of a tandem master cylinder that can be provided with a sealing means according to the invention.

FIG. 1 illustrates a master cylinder 1 of an automobile, according to the invention. The master cylinder is here a tandem master cylinder. The invention is of course applicable to the case where the master cylinder is a single one. Such a tandem master cylinder 1 comprises a body 2 hollowed out in a bore 3. This master cylinder also includes a primary hydraulic circuit provided with a primary piston 4 and a secondary hydraulic circuit provided with a secondary piston 5. The primary piston 4 and the secondary piston 5 slide along a wall 6 delimited by the bore 3 of the body 2. The primary piston 4 and the secondary piston 5 slide longitudinally along an axis of insertion 7 of a thrust rod (not shown) inside the master cylinder 1. The master cylinder is actuated by the thrust rod which is itself actuated when the brake pedal (not shown) is pressed. A receptacle 10 receiving this thrust rod is formed at a rear end 11 of the piston 4, a front end 12 of the primary piston being intended to be placed facing the secondary piston 5. Normally, the axis 7 is an axis which is coincident with an axis of movement of the primary piston 4 and with an axis of movement of the secondary piston 5.

The primary piston 4, the secondary piston 5 and the wall 6 of the master cylinder delimit a primary chamber 13. The secondary piston 5 and the wall 6 of the master cylinder 1 delimit a secondary chamber 14. The primary piston 4 is designed to compress a hydraulic brake fluid or a brake liquid contained in the primary chamber 13. The secondary piston 5 is designed to compress a hydraulic brake fluid or brake liquid contained in the secondary chamber 14. Each of the brake liquids contained in the primary chamber 13 and in the secondary chamber 14 respectively, come from a primary hydraulic fluid reservoir 15 and a secondary hydraulic fluid reservoir 16 respectively. The primary reservoir 15 and the secondary reservoir 16 feed the primary chamber 13 and the secondary chamber 14 with fluid respectively via a primary conduit 17 and via a secondary conduit 18. The primary conduit 17 and the secondary conduit 18 are hollowed out in the body 2 of the master cylinder and emerge in the primary chamber 13 and in the secondary chamber 14 respectively.

The master cylinder 1 also has at least one seal. Preferentially, each chamber may have two seals. Each of these sealing means is made of rubber with a longitudinal section relative to the axis 7 in the form of a U. Each of these means forms a ring positioned coaxially with respect to the axis 7.

As previously mentioned, the primary chamber 13 includes a first sealing means or primary sealing cup 19 and a second sealing means or primary seal 21. The secondary chamber 14 includes a third sealing means or secondary sealing cup 20 and a fourth sealing means or secondary seal 22. The invention relates to any one of these seals or cups, or to several or to all of them.

The primary cup 19 and the secondary cup 20 are positioned respectively at an inlet 8 of the primary chamber 13 and at an inlet 9 of the secondary chamber 14. The primary cup 19 provides a seal for the primary chamber 13 relative to the outside of the master cylinder. The secondary cup 20 provides a seal for the secondary chamber 14 relative to the primary chamber 13.

The primary seal 21 is positioned between the wall 6 of the bore 3 of the body 2 and the primary piston 4. The secondary seal 22 is positioned between the wall 6 of the bore 3 of the body 2 and the secondary piston 5. The primary seal 21 and the secondary seal 22 are positioned respectively in a primary peripheral groove 23 and in a secondary peripheral groove 24 while being placed respectively facing the primary piston 4 and the secondary piston 5. The primary groove 23 and the secondary groove 24 are hollowed out in the wall 6 of the body 2 around the axis of movement of the primary piston 4 in a plane that is perpendicular to this same axis.

The primary seal 21 and the secondary seal 22 make it possible to control respectively the passage of brake fluid from the primary reservoir 15 and the secondary reservoir 16 in the direction of the primary chamber 13 and the secondary chamber 14 respectively.

According to the invention, in FIG. 1, the primary cup 19, the secondary cup 20, the primary seal 21 and the secondary seal 22 may be at least partially stiffened. In particular, in FIG. 2, the primary seal 21 has a primary stiffening reinforcement 25. The secondary seal, 22, the primary cup 19 and the secondary cup 20 may also have a reinforcement. In order to simplify the description of the invention, the invention will be described for the primary seal 21.

This primary seal 21 has an outer lip 27 and an inner lip 28. The outer lip 27 and the inner lip 28 are each cylindrical overall. The generating lines for these cylinders are parallel to the axis of movement of the primary piston 4. The outer lip 27 and the inner lip 28 are connected by an intermediate radial crown 29. The outer lip 27 and the inner lip 28 delimit an opening 30 between them which may be directed towards the secondary chamber 14. The primary seal 21 is positioned around the axis of movement of the primary piston 4. The outer lip 27 is placed at a location away from the primary piston 4. More precisely, the outer lip 27 is placed inside the primary groove 23, being applied at rest against the wall 6 of the bore 3 of the master cylinder 1. The inner lip 28 is placed at a location close to the primary piston 4. The inner lip 28 is placed at least partially outside the primary groove 23 and may be positioned at the location of the primary groove 23 spanning the alignment of the bore 3. More precisely, at rest, that is to say when the brake pedal is not actuated, the inner lip 28 may be placed applied against a location of the primary piston 4 so that brake liquid creeps between the primary reservoir 15 to the primary chamber 13 through a primary orifice 33. In point of fact, the primary piston 4 and the secondary piston 5 are provided with a primary orifice 33 and a secondary orifice 34 respectively. Each of these orifices emerges through a first end 47 facing the wall 6 of the master cylinder and through a second end 48 facing the corresponding chamber.

The reinforcement 25 may be made of metal or of a synthetic plastic material. When the reinforced primary seal 21 has a reinforcement made of synthetic plastic material, such a primary seal may be obtained following a first molding and a second molding of a first material made of plastic and a second material made of plastic. The first molding makes it possible to form the reinforcement 25 and the second molding or overmolding is created on the reinforcement 25 so as to form the primary seal 21. Preferably, the first plastic material is hard and the second material is flexible, for example made of rubber.

The primary reinforcement 25 is created in such a way that it gives the seal fitted with such a reinforcement a property of flexibility.

Such a primary seal 21 provided with such a reinforcement 25 makes it possible to reinforce the rigidity of the primary seal 21. This rigidity prevents the inner lip 28 from turning over, which would be brought about by the primary piston 4 rubbing against such a primary seal 21. Friction is produced during movements of the primary piston 4 along the wall 6 of the master cylinder. The friction to be overcome is that brought about by sudden movements of the pistons.

Such a reinforced primary seal 21 makes it possible to prevent the primary seal 21 from extruding from the primary groove 23 during movements of the primary piston 4. Or, indeed, such a reinforced seal 21 makes it possible to prevent this same primary seal 21 from tearing during the same movements of the primary piston 4.

The primary seal reinforced in this way is partially stiffened while retaining the property of elasticity.

Figure 4:
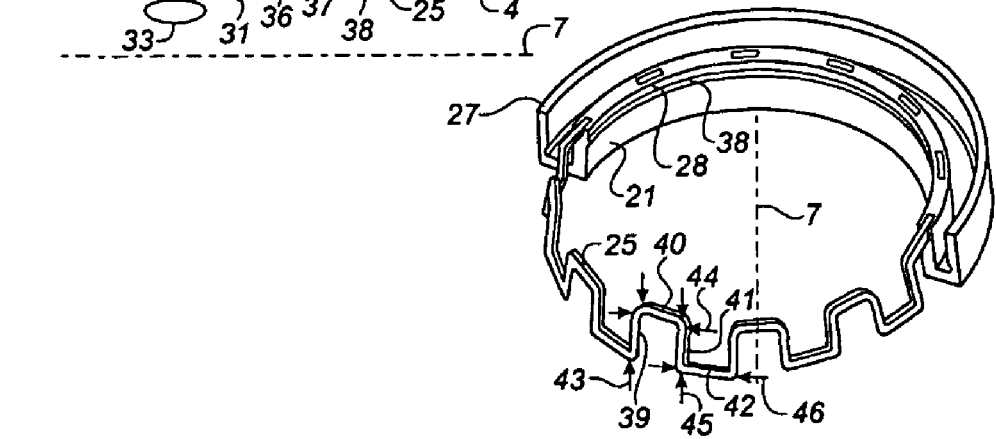
FIG. 4 is a three-dimensional representation of a sealing means, according to the invention.

The primary reinforcement 25 may be incorporated in the inner lip 28 so as to form a reinforced primary seal 21. The reinforcement 25 is at least partially peripheral along the inner lip 28. In FIG. 4, the primary reinforcement 25 is completely peripheral and, according to this example, forms a ring. The primary reinforcement 25 extends circularly in the shape of a circular cylinder with an axis coaxial to the axis of movement of the primary piston 4. Preferably, the lip 28 and the reinforcement 25 have a truncated conical form. The point of this truncated conical form is directed along the direction of forward movement of the piston during braking. The reinforcement 25 is formed of a wire, preferably a flat wire, provided with a series of identical crenellated portions, so that each is connected to the remainder of the others. The crenellated portions may be connected to each other so as to form an annular ring. Or, indeed, the identical portions may also be distributed along the inner lip without being connected together. Each of the crenellated portions is formed of a first section 39, a second section 40, a third section 41 and, a fourth section 42. The first section 39, the second section 40, the third section 41 and the fourth section 42 are each connected to the remainder of the others.

The first section 39 extends in a first direction relatively parallel to the axis of movement of the primary piston 4. The second section 40 extends from the first section 39 along a first portion of the circumference of the cylinder. The third section 41 extends in a second direction opposite the first direction. The fourth section 42 extends from the third section along a second portion of the circumference of the cylinder, in a direction concentric with the second section.

The first section 39, the second section 40, the third section 41 and the fourth section 42 comprise respectively a first length 43, a second length 44, a third length 45 and a fourth length 46. The first length 43 and the third length 45 are measured along an axis relatively parallel to the axis of movement of the primary piston 4. The second length 44 and the fourth length 46 are measured respectively along the first circumference and along the second circumference of the cylinder. The first length 43 and the third length 45 are identical. The second length 44 and the fourth length 46 are identical. The first length 43 and the third length 45 on the one hand, and the second length 44 and the fourth length 46 on the other hand may be identical to each other or indeed different from each other.

Such a string of sections gives the reinforcement the property of flexibility and elasticity. Typically, the flat nature of the wire and the sections 39 and 41 increase the longitudinal stiffness of the seal 21. The lip 28 cannot turn back on itself. On the other hand, in a radial direction, the elasticity is hardly modified at all. This retention of characteristic is favorable for leakproofness on the one hand and for the creep of hydraulic fluid on the other hand, The primary piston 4 and the secondary piston 5 are returned to the rest position respectively by a primary return spring 49 and by a secondary return spring 50.

In order to ensure that the primary piston 4 and/or the secondary piston 5 are retained in the bore 3 of the master cylinder, it is possible with the invention to hold this same primary piston 4 and/or the secondary piston 5 in place inside the bore 3. This holding action is produced by cooperation of a reinforced seal and the primary piston 4 and/or the secondary piston 5.

Figure 2:
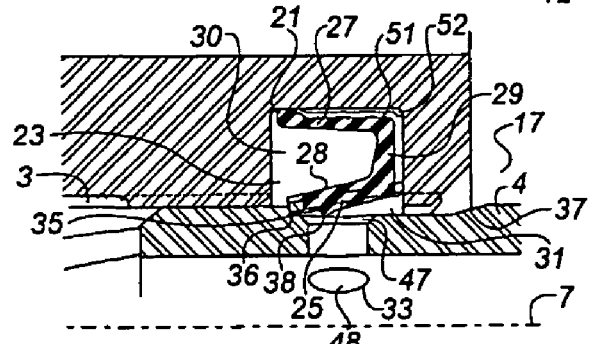
FIG. 2 is a partial representation of a master cylinder in the rest position fitted with a seal according to the invention.
Figure 3:
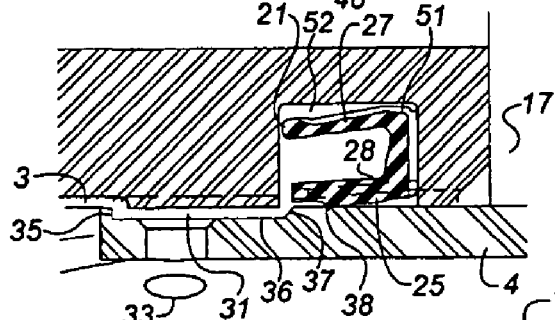
FIG. 3 is a partial representation of a master cylinder in the braking position, fitted with a seal according to the invention.

The cooperation of the primary seal 21 with the primary piston 4 may be achieved by means of a primary rebate or groove 31 hollowed out radially on a surface of the primary piston 4, in FIG. 2. It may be the same for the secondary piston 5. Only the primary groove 31 is described. The primary seal 21 according to the invention has the function of retaining the primary piston in the bore by cooperation of the inner lip 28 with the groove 31.

The primary piston 4 is positioned in the bore with the top of the inner lip 28 of the primary seal 21 placed bearing against the groove 31, at the bottom of the rebate in FIG. 2. Positioned in this way with respect to the primary seal 21, there is no longer a risk of the primary piston 4 being extracted from the bore 3. This retention is particularly useful following a sudden return of the primary piston 4 into the rest position or when the master cylinder is transported. Such transport occurs from one place to another with a view to mounting the master cylinder in the vehicle.

More precisely, the primary groove 31 is formed on a surface of the primary piston 4 and on all of a circumference of the primary piston 4. This primary groove 31 is formed at the location of the primary piston 4 close to the primary seal 21 in FIG. 2. Another primary groove (not shown) could be made at a location close to the primary cup 19 in addition to or in place of the preceding primary groove 31.

In FIG. 2, the primary groove 31 forms, from the front end 12 in the direction of the rear end 11 of the primary piston 4, longitudinally with respect to the axis of the primary piston 4, a first surface 35, a second surface 36 and a third surface 37 connected together continuously. The first surface 35 is made in a plane perpendicular to the axis 7, and the second surface 36 is made in a plane relatively parallel to this same axis 7 so that the first surface 35 and the second surface 36 are perpendicular to each other. The third surface 37 may be inclined and connects the second surface 36 to the remainder of the surface formed by the primary piston 4.

At rest, that is to say when the brake pedal is not actuated, the primary seal 21 is placed bearing against the groove 31 downstream from the primary orifice 33, longitudinally with respect to an axis passing through the primary orifice and relatively parallel to the axis of the piston, in the direction in which the primary piston moves forward during braking operations. The primary orifice 33 may be hollowed out from the second surface 36 of the groove. The primary seal 21 may be positioned bearing only against the first surface 35 or against the second surface 36 at the same time. Or the primary seal 21 may be positioned bearing only against the first surface 35 or only against the second surface 36. The primary piston 4 is positioned with respect to the primary seal 21 and the primary conduit 17 so that brake liquid flows from the primary reservoir 15 in the direction of the primary chamber 13 via the primary conduit 17 and via the primary orifice 33.

Then, at the moment that the vehicle is braked, that is to say when the brake pedal is actuated, the primary piston 4 is forced into the bore 3 of the master cylinder in the direction of the secondary piston 5 and longitudinally with respect to the axis of the primary piston 4. The primary piston 4 slides along the wall 6 of the bore 3 of the master cylinder and therefore along the primary seal 21. The primary seal 21 is positioned bearing against the primary piston between the primary orifice 33 and the primary conduit 17. The primary seal 21 is placed upstream from the primary orifice 33, longitudinally with respect to an axis passing through the primary orifice and relatively parallel to the axis of the piston, in the direction in which the primary piston moves forward during braking. The liquid can no longer pass through the primary orifice 33 because the primary seal 21 is placed bearing against the primary piston and therefore obstructs access to liquid through the primary orifice 33. A rise in pressure is produced in the primary chamber 13. The primary seal 21 is placed bearing against the remainder of the surface of the primary piston 4. However, the primary seal 21 could be placed bearing against the second or third surface of the primary groove 31.

The primary seal 21 may be provided with at least one refilling channel 51 disengaging a space 52 between the primary seal 21 and the wall 6 inside the primary groove 23. The refilling channel 51 is formed from the radial crown 29. The space 52 enables brake liquid to be stored for supplying other braking devices such as the E.S.P. (Electronic Stability Program) independently of the functioning of the master cylinder.

When the primary piston 4 returns to the rest position, the primary piston 4 slides along the wall 6 to a rest position. As the primary piston 4 slides along the wall 6, the primary seal 21 once more allows liquid to circulate from the primary conduit 17 to the primary chamber 13 either by creeping between the primary piston 4 and the wall 6 and/or by circulating from the conduit 17 to the primary chamber 13 through the primary orifice 33. Liquid may creep between a point on the wall 6 placed facing the remainder of the surface of the primary piston 4 and the piston 4 on account of the fact that the outer lip 27 of the primary seal 21 may rise with respect to the wall 6. A slight rise of the outer lip 27 of the primary seal 21 with respect to the wall 6 may be produced at any time that the brake pedal begins to be released. This rise enables liquid to creep between the outer lip 27 and the wall 6 while the inner lip 28 is still bearing against the primary piston 4 and this same inner lip 28 still obstructs the passage of fluid from the primary conduit 17 to the primary orifice 33. Liquid creeps between the raised outer lip 27 and the wall 6 through the refilling channel 51.

The primary chamber may be refilled while the primary piston 4 has not yet returned to an initial rest position. This early refilling makes it possible to be able to brake once again as the need arises when the primary piston 4 has not yet returned to its initial rest position.

The primary seal 21 has a primary projection 38 rising perpendicularly to a plane formed by a surface of the inner lip 28, this surface being designed to be placed facing the primary piston 4. This projection 38 is made over all the periphery of the primary seal 21. At rest, this projection 38 is placed facing the primary orifice 33, without obstructing it. On braking, the primary piston 4 is displaced so that the projection 38 is situated bearing against the primary piston 4. This projection 38 makes it possible to reduce the dead travel of the primary piston 4. The dead travel of the primary piston 4 is understood to mean a distance which the primary piston 4 should cover in the bore 3 so that braking of the vehicle is obtained. This distance is measured longitudinally with respect to the axis of the primary piston 4 between a location of the primary piston facing which the protuberance 38 is positioned when the primary piston is in the rest position and another location of the primary piston 4 facing which the projection 38 is brought to bear during the braking phase. Once in contact with the primary piston 4 and positioned upstream from the primary orifice 33, the projection 38 obstructs the passage of liquid between the primary conduit 17 and the primary orifice 33.

The invention also applies in the case of a master cylinder provided with a single chamber and a single piston.

What is claimed is:

1. A master cylinder (1) of an automobile, comprising
a body (2) hollowed out to form a bore (3),
at least one piston (4, 5) sliding along a wall (6) formed by the bore of the body and defining a chamber (13, 14),
at least one hydraulic fluid reservoir (15, 16) emerging in the bore, and
at least one seal (21, 22) for the chamber having a U-shaped section housed between the wall and the piston, characterized in that:
the seal including a stiffening reinforcement (25) that extends circularly in a circular cylinder shape with an axis coaxial with an axis of movement of the piston, the reinforcement being formed of a wire having a series of identical crenellated portions, each connected to the remainder of the others, said portions each being formed of a first section (39) that extends in a first direction parallel to the axis of the piston, a second section (40) that extends from the first section and is carried by a first circumference of the cylinder and extending along a portion of the circumference of the cylinder, a third section (41) that extends from the second section in a second direction opposite to the first direction and a fourth section (42) that extends from the third section and is concentric with the second section and is carried by a second circumference of the cylinder, said seal having an outer lip (27) and an inner lip (28), the outer lip and the inner lip being connected by an intermediate section (29), the outer lip being placed at a first location away from the piston and the inner lip being placed at a second location close to the piston, the inner lip including the reinforcement, said piston (4) having a peripheral rebate (31) hollowed on it's circumference, against which the top of the inner lip of the seal (21) bears to form a stop for the piston inside the body (2).

2. The master cylinder according to claim 1, characterized in that the inner lip (28) has a projection (38) rising perpendicularly to a plane formed by a surface of the inner lip that faces the piston, the projection being designed to bear against the piston when the piston moves in the bore of the master cylinder.

3. The master cylinder according to claim 2, characterized in that the reinforcement is positioned at least partly peripheral along the inner lip (28).

4. The master cylinder according to claim 3, characterized in that the wire is flat.

5. The master cylinder according to claim 3, characterized in that each second section and each fourth section have respectively an identical second length (44) and an identical fourth length (46), said second length and said fourth length being measured along the circumference of the cylinder.

6. The master cylinder according to claim 5, characterized in that the reinforcement is metallic.

7. The master cylinder according to claim 5, characterized in that the reinforcement is made of plastic.

* * * * *